US005905004A

United States Patent [19]

Sakai et al.

[11] Patent Number: 5,905,004

[45] Date of Patent: May 18, 1999

[54] ELECTRODE FOR ALKALI SECONDARY BATTERY AND METHOD FOR PRODUCING THE SAME

[75] Inventors: Tetsuo Sakai; Itsuki Uehara, both of Ikeda; Hiroshi Yoshinaga; Masasi Wada, both of Kyoto, all of Japan

[73] Assignees: Director General, Agency of Industrial Science & Technology; Fukuda Metal Foil & Powder Co., Ltd., both of Japan

[21] Appl. No.: 08/816,008

[22] Filed: Mar. 10, 1997

[30] Foreign Application Priority Data

Mar. 13, 1996 [JP] Japan .................................... 8-055899

[51] Int. Cl.$^6$ .............................. H01M 4/62; H01M 4/80

[52] U.S. Cl. .......................... 429/232; 429/235; 429/245; 29/2; 419/66

[58] Field of Search .................................... 429/232, 235, 429/245; 29/2; 419/66

[56] References Cited

U.S. PATENT DOCUMENTS 5,395,712 3/1995 Furukawa ............................ 429/232 X

OTHER PUBLICATIONS by H. Yoshinaga et al., "Metal Hydride Electrodes Made by Dry Powder Process Using Flake Copper and Flake Nickel Powders", 1995, pp. 847–852, (month unknown).

by H. Yoshinaga et al., "Metal Hydride Electrodes With Lamellar–Type Network Structure Made by Dry Powder Process", 1996, p. 13, (Aug.).

by H. Yoshinaga et al., "Metal Hydride Electrodes With Lamellar–Type Network Structure", 1997, pp. 665–667, (month unknown).

*Primary Examiner*—Stephen Kalafut
*Attorney, Agent, or Firm*—Parkhurst & Wendel, L.L.P.

[57] ABSTRACT

The primary object of the present invention is to provide an electrode for an alkali secondary battery, the electrode being capable of exhibiting high binding power and showing a high electrical conductivity without use of a binder. An electrode for an alkali secondary battery, the electrode comprising a molded product molded from a mixture containing an active material-containing powder and a flaky nickel powder which has lowered strain.

17 Claims, 6 Drawing Sheets

20 μm

20 μm

ELECTRODE FOR ALKALI SECONDARY BATTERY AND METHOD FOR PRODUCING THE SAME

FIELD OF THE INVENTION

The present invention relates to an electrode for an alkali secondary battery and a method for producing the same.

BACKGROUND OF THE INVENTION

Among batteries or cells having an electrode produced using a nickel powder such as Ni—MH batteries, there are those which have attracted attention because they do not contain elements controlled under an environmental pollution regulation, have density sufficient to generate high energy and are interchangeable with existing secondary batteries.

Proposed methods for producing these batteries are, for example, (a) a method comprising integrally combining a powder predominantly containing an active material with a current collector using a polymer binder, (b) a method comprising applying a paste of a powder predominantly containing an active material to a substrate of foamed nickel or fibrous nickel and subjecting the substrate to pressure molding, and (c) a method comprising integrally uniting a powder predominantly containing an active material with a current collector under compression using a nickel carbonyl powder.

However, the proposed methods have problems. The method (a) requires a polymer binder which offers electrical resistance to current flow, resulting in the reduction of high discharging capability. The method (b) necessitates an expensive foamed nickel or fibrous nickel substrate, leading to a high production cost. The method (c) presents a problem of low binding power which makes the powders easily removable.

SUMMARY OF THE INVENTION

The primary object of the present invention is to provide an electrode for an alkali secondary battery, the electrode being capable of exhibiting high binding power without use of a binder and showing a high electrical conductivity.

The inventors of the present invention conducted extensive research to overcome the problems of the prior art and found that an electrode containing a nickel powder having a specific structure can achieve the foregoing object.

According to the present invention, there are provided:

1. an electrode for an alkali secondary battery, the electrode comprising a molded product molded from a mixture containing an active material-containing powder and a flaky nickel powder which has lowered strain;
2. a method for producing an electrode for an alkali secondary battery, the method comprising the steps of heat-treating a flaky nickel powder, mixing the powder with an active material-containing powder, and molding the mixture; and
3. a method for producing an electrode for an alkali secondary battery, the method comprising the steps of mixing an active material-containing powder with a flaky nickel powder, molding the mixture and heat-treating the molded product.

DETAILED DESCRIPTION OF THE INVENTION

Figure 1:
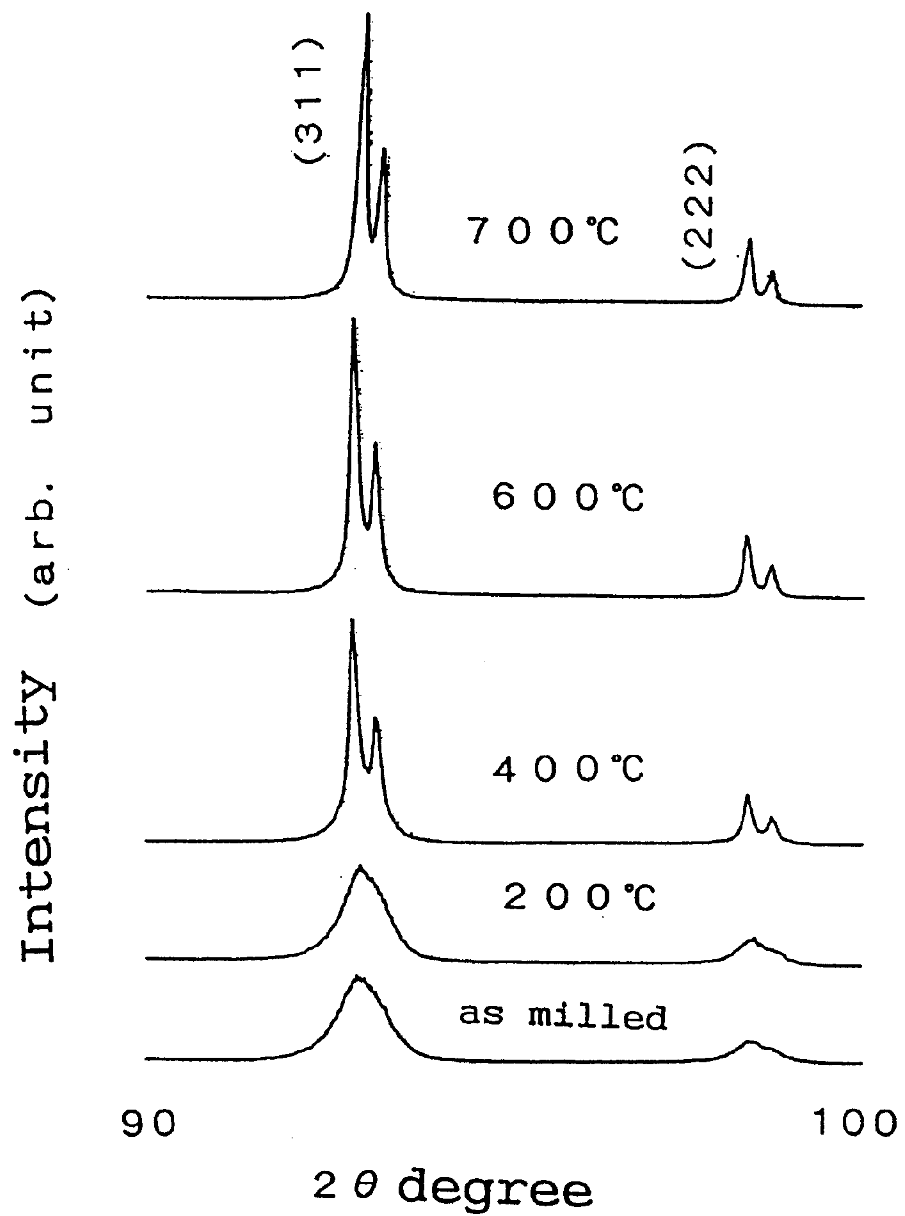
FIG. 1 shows the results of X-ray diffraction analysis of a flaky powder which was heat-treated at each temperature in Example 1.

The present invention is described below with reference to modifications of the invention.

A preferred shape of nickel powders to be used in the invention is flaky. Nickel powders to be used may contain nickel particles of other shapes such as an dendritic shape, fibrous shape, needle-like shape, spherical shape or the like. Flaky nickel powders for use herein include commercially available powders.

Nickel powders which can be used in the invention are those of lowered strain. The term "lowered strain" used in the specification and the appended claims refers to lowered lattice strain. In the present invention, the greater the extent of reduction in strain, the better. The extent of reduction in strain can be based on dynamic hardness. The greater the extent of reduction in strain, the lower the dynamic hardness. Nickel powders useful in the invention have a dynamic hardness of about 300 DH or less, preferably about 250 DH or less.

Preferred nickel powders are those having a long diameter as compared with the thickness. Stated more specifically, nickel powders suitable for use in the invention are about 4 to about 14 Mm in average diameter and about 0.5 to about 1.0 μm in average thickness, which is about 1/4 to about 1/28 the diameter.

When required, the active material-containing (or predominantly containing) powder (hereinafter referred to as "active material powder") may contain a nickel carbonyl powder, a cobalt powder, a carbon powder or like electrically conductive aids in addition to the active material.

Useful active materials are not specifically limited in the present invention and include conventional materials, e.g. metals such as iron, zinc, cobalt, cadmium and the like; metal hydrides or hydrogen absorbing alloys such as $LaNi_5$, $Ti_{0.1}Zr_{0.9}Ni_{1.2}Mn_{0.6}Cr_{0.2}$ and the like; and metal hydroxides such as nickel hydroxide, manganese hydroxide and the like. These powders can be used either alone or in combination.

Preferably hydrogen absorbing alloys are used as the active material in the present invention. Although not specifically limited in the invention, useful hydrogen absorbing alloys include $AB_5$ type $LaNi_5$ alloys, $MmNi_5$ alloys (Mm means misch metal, i.e. a mixture of rare earth alloys), Laves type $TiMn_2$ alloys, $ZrMn_2$ and like alloys which have Mn partly substituted by Ni, TiNi alloys, ZrNi alloys, MgNi alloys, V-Ni alloys and polytopic alloys of their improved type all of which are alloys containing nickel as an essential element.

The diameter of the active material powder to be used in the invention is not essential, but usually about 1 to about 30

μm. Especially when fine particles of the active material up to 10 μm in diameter are used, nickel particles can be efficiently dispersed, and the resulting electrode, when assembled into a cell, provides the cell with improved properties.

The electrode of the invention comprises a molded product molded from a mixture containing an active material powder and a flaky nickel powder of lowered strain. Preferably the molded product has a network wherein flaky nickel particles are arranged in layers.

Stated more specifically, the electrode of the invention has the following structure. In the electrode, individual flaky nickel particles extend, at least in their diameter direction, in continuous contact with adjacent nickel particles in parallel or substantially in parallel with the electrode surface so as to support the active material powder with their layer skeleton. Due to this structure, the electrode can exhibit excellent binding power and a high electrical conductivity.

According to the invention, the molded product can be produced, for example, by mixing the active material powder with the heat-treated flaky nickel powder and molding the obtained mixture. Molded products produced according to the invention include moldings having a current collector integrally molded therein.

Active material powders to be used in the method of the invention are not specifically limited and include those already described.

In the practice of the invention, first a flaky nickel powder is heat-treated, whereby the strain of the flaky nickel powder is lowered. The heat-treating temperature is not critical in the invention insofar as the above-defined dynamic hardness is reached. It is usually about 300 to about 900° C., preferably about 400 to about 700° C., although variable depending on the properties of the nickel powder or other factors before heat treatment. If the heat-treating temperature is lower, the strain would not be fully lowered, whereas a higher temperature would be likely to sinter the flaky nickel powder. The heat-treating time is suitably selected according to the heat-treating temperature or other factors. A preferred atmosphere for heat treatment is one of inert gas such as argon, nitrogen, helium or the like. If an atmosphere of reducing gas is used, the oxide layer on the nickel powder surface may be removed, tending to induce sintering.

In the practice of the invention, the molded product molded from a mixture containing an active material powder and an untreated nickel powder may be heat-treated. The heat-treating temperature and the heat-treating time in this case are the same as the above treatment. Although the heat-treating atmosphere for this purpose may be either one of inert gas or one of reducing gas, one of reducing gas is preferred. In this case, it is preferred to use a reducing gas such as hydrogen gas, carbon mono-oxide gas, ammonia-decomposing gas or methane gas.

Next, the powders are mixed. The proportions of the active material powder and the flaky nickel powder of lowered strain can be suitably selected according to the type of the active material powder or other factors. Usually the flaky nickel powder is used in a proportion of about 5 to about 50 parts by weight, preferably about 10 to about 20 parts by weight, per 100 parts by weight of the active material powder. Due to the proportions thus selected, an electrode can be easily produced which has a cross section structure wherein the nickel particles are orientated in continuous contact with adjacent nickel particles. Owing to this structure, advantages in properties of the cell and in economical aspect are provided.

If the proportion of the nickel powder is less than 5 parts by weight, the nickel particles would not achieve sufficient contact with adjacent particles and the desired network can not be formed. In this case, a more amount of the active material powder would be present in the layers of the network, a sufficient amount of the electrical charge can not be discharged and an increased number of cycles is required to reach a maximum discharge capacity. Further, the electrodes produced are irregular in properties.

If the proportion of the nickel powder exceeds 50parts by weight, the nickel powder can not achieve a marked improvement in the extent of orientation in an expected degree. Moreover, in this case, the active material powder would be surrounded with the flaky nickel powder. If the active material is, for example, a hydrogen absorbing alloy, the hydrogen gas can not be smoothly absorbed or released so that the maximum discharge capacity would be decreased and a more number of cycles (cycles for activation) would be needed to reach the maximum discharge capacity. Furthermore, the costs for the production of electrodes would be raised. Hence the proportion is undesirable.

In the foregoing mixing procedure, if the active material powder which is easily oxidized is mixed with the nickel powder in the air, at least the active material powder may be coated with an antioxidant or corrosion inhibitor which is usually used in the powder metallurgy field. The coating of the powder prevents oxidation of the powder and enhances the dispersibility of the powder, leading to an improved extent of orientation of nickel particles in the electrode. Useful antioxidants and corrosion inhibitors are, for example, conventional higher fatty acids such as stearic acid and oleic acid and metal salts thereof. While liquid fat and oil can produce a marked effect as an antioxidant or a corrosion inhibitor, solid fat and oil, if dissolved in a solvent, can show the same degree of effect as liquid fat and oil. If liquid fat and oil or solid fat and oil dissolved in a solvent are quickly applied to the surface of the two powders in mixing the powders, anti-oxidizing and anti-corrosive effects would be achieved at the initial stage of mixing, thereby making it possible to mix the powders in the air. The active material powder and the nickel powder coated with the oil and fat are so lubricated that the particles are made slippery against other particles and easily moved in the powder mixture during mixing. As a result, the nickel powder is substantially aligned (orientated) in a specific direction in parallel with the electrode surface by the synergistic effect which is derived from the compaction of particles under compression by a roller and from the dimensional characteristic of nickel particles due to the difference in size between the diameter and the thickness.

If, for example, brittle and hard hydrogen absorbing alloy particles are mixed with nickel particles which are softer than the alloy using a kneader or the like, the alloy particles would be divided into finer particles, and the accumulated or agglomerated nickel particles would be easily separated into individual particles.

In mixing the active material powder with the flaky nickel powder, mixers conventionally employed in the powder metallurgy field can be used as such. More specific examples of useful mixers include kneaders, ball mills, vibrating mills, attritors, etc. To reduce the extent of accumulation of the active material particles (usually to accumulation of 5 particles or less) existing in the network, the piled or agglomerated active material particles and nickel particles need to be efficiently separated into individual particles during mixing. Thus it is preferred to use mechanofusion type mixers capable of giving shear force to the particles (such as commercially available product of Hosokawa Micron Co., Ltd.). The operational conditions of such mixers are not specifically limited but usually the number of revolution is about 300to about 900 rpm, and the mixing time is about 120 seconds to about 5 minutes.

To prevent oxidation, the active material powder and nickel powder are desirably mixed together in an atmosphere of non-oxidizing gas such as argon, nitrogen or the like. These powders can be mixed in the air as described above when an antioxidant or a corrosion inhibitor is used.

Next, the powder mixture prepared above is molded. For example, the mixture is placed into a mold and is compacted under compression by a roller or the like. Subsequently the compacted mixture is subjected to pressure molding (dry press molding), giving an electrode in the form of a sheet. In this case, the obtained sheet has a cross section structure wherein the nickel particles are arranged (orientated) in continuous contact with adjacent nickel particles in parallel or substantially in parallel with the electrode surface (in other words, vertically or practically vertically of compression direction during molding). According to the cross section structure of the molded product, the nickel powder can collect a current from the active material powder with high efficiency.

Nickel particles which have a much longer diameter relative to the thickness are more easily orientated in parallel with the electrode surface when compacted under compression by a roller. If the active material particles are merely mixed in a simple manner with the nickel particles, the nickel particles would be orientated in an irregular direction. However, if the particles charged in the mold are compressed at least once (preferably repeatedly at plural times) by a roller which is moved from one end to the other, the active material particles having a long diameter relative to the thickness, even if initially orientated in a vertical direction in the mixture within the mold, would gradually turn to a horizontal direction, finally becoming arranged in parallel or substantially in parallel with the electrode surface. If the diameter of the nickel particles is much longer relative to the thickness, the nickel particles would be orientated to a more extent by roller compaction. On the other hand, if the diameter of the nickel particles is short relative to the thickness like the diameter of the active material particles, a cross section structure would not be brought about wherein the nickel particles are continuously orientated in parallel or substantially in parallel with the electrode surface.

When required, the powder mixture is gradually placed in half the required amount into a mold cavity in a shape corresponding to the specific electrode while the particles are compacted by a roller, then a current collector (metal mesh such as nickel expanded metal) is placed onto the compacted powder, and the remaining powder portion is deposited during roller compaction on the powder portion initially placed.

Thereafter, the compacted powders in the mold are molded. The molding is conducted by molding methods conventionally used in the powder metallurgy field. It is desired to mold electrodes by a dry press method, a wet press method or the like. Molding pressures are not specifically limited in the invention but usually about 5 to about 500 MPa, preferably about 100 to about 300 MPa.

The present invention can achieve the following results.

(1) Since the flaky nickel powder of reduced strain is used, a proper layer network can be formed in close contact with the active material powder, with the result that electrical conductivity can be enhanced and that improvements can be achieved in the initial activating characteristic, the discharge capacity and cycle life.

(2) Because expensive materials such as foamed nickel are not used, an alkali secondary battery can be provided at a relatively low cost.

(3) An electrode can be easily and assuredly molded without use of a binder so that the electrodes can be easily recycled.

(4) The electrodes of the invention can be molded using virtually any kind of active materials, and can be used as either a positive or a negative one.

EXAMPLES

Example 1

(1) Preparation of a Powder Mixture for Electrodes

A rare earth-type hydrogen absorbing alloy powder ($LaNi_{3.4}Co_{1.2}Al_{0.4}$) having an average diameter of up to 75 μm was used as an active material powder. On the other hand, used as a nickel powder was a heat-treated flaky nickel powder (trademark "Ni-FLAKE 95", about 10 μm in diameter and about 1 μm in thickness, product of Fukuda Metal Foil And Powder Co., Ltd.).

A 50 g portion of the flaky nickel powder was placed into a boat of stainless steel (trade name "SUS 304") and was heat-treated at four different temperatures in an atmosphere of argon. The heat-treating temperatures were 2000° C., 4000° C., 600° C. and 800° C. At each temperature, the powder was maintained for 30 minutes, followed by cooling to room temperature. The obtained powder was passed through a sieve of 75 μm mesh, and the particles having passed through the sieve were used as a specimen.

(2) Influence of Heat-Treating Temperature on the Strain of Flaky Nickel Powder

X-ray diffraction was conducted to investigate how the heat-treating temperature affected the strain (internal stress) of the flaky nickel powder. The results are shown in FIG. 1.

The X-ray diffraction of the untreated flaky nickel powder showed that the peaks on (311) plane and (222) plane at a diffraction angle 2θ of 90 to 100 degrees were broad. On the other hand, the powders heat-treated at a temperature of at least 200° C. were highly crystalline and showed acute-angle peaks. This means that the untreated flaky nickel powder had relatively high strain inside.

(3) Influence of Heat-Treating Temperature on Dynamic Hardness

Investigation was made to check how the heat-treating temperature of the flaky nickel powder affected the dynamic hardness (DH). The results are shown, together with the diameter distribution, in Table 1. The dynamic hardness was measured by a microhardness meter (trade name "DUH-201S", product of Shimadzu Mfg. Co., Ltd.). Measuring conditions were: indentator diamond triangular indentator; test force=2.5 mN; load=0.284 mN/s and holding time=10 s. The diameter distribution was measured by a laser optical diffraction microtrack (product of Nikkiso Co., Ltd.).

TABLE 1

| | Hardness (DH) | Diameter (μm) |
|---|---|---|
| As milled | 335 | 9.69 |
| 400° C. | 223 | 10.9 |
| 600° C. | 197 | 12.5 |

As apparent from Table 1, the flaky nickel powder exhibited a relatively high hardness, i.e. 335 DH when not heat-treated, but a lower hardness 223 DH when heat-treated at 400° C. and a further lower hardness 197 DH when heattreated at 600° C.

(4) Preparation of Hydrogen Absorbing Alloy Electrode

A 25 g portion of each flaky nickel powder per 100 g of the hydrogen absorbing alloy powder was mixed for 15 minutes by a mixer (trade name "Mechanofusion AM-15F", product of Hosokawa Micron Co., Ltd.).

The obtained powder mixture was molded by dry press method integrally with a nickel expanded metal (0.1 mm in wire diameter, 20 mesh) used as a current collector to give a sheet (30 mm×40 mm×about 0.6 mm (thickness)) which was provided as a test electrode. The molding pressure was 294 MPa.

An open type battery with sintered nickel hydroxide electrodes on both sides (under an alloy electrode regulation) was produced using said test electrode as a negative electrode. The battery was charged and discharged at 200° C. The charge was conducted to add an electrical charge in an amount of 100 mA/g of the alloy for 4 hours. The total charge amount was 400 mAh/g. After a rest was taken for 30 minutes to remove bubbles from the surface of the electrode, discharge was effected in a current amount of 100 mA/g until a voltage of 0.8 V was reached.

Figure 2:
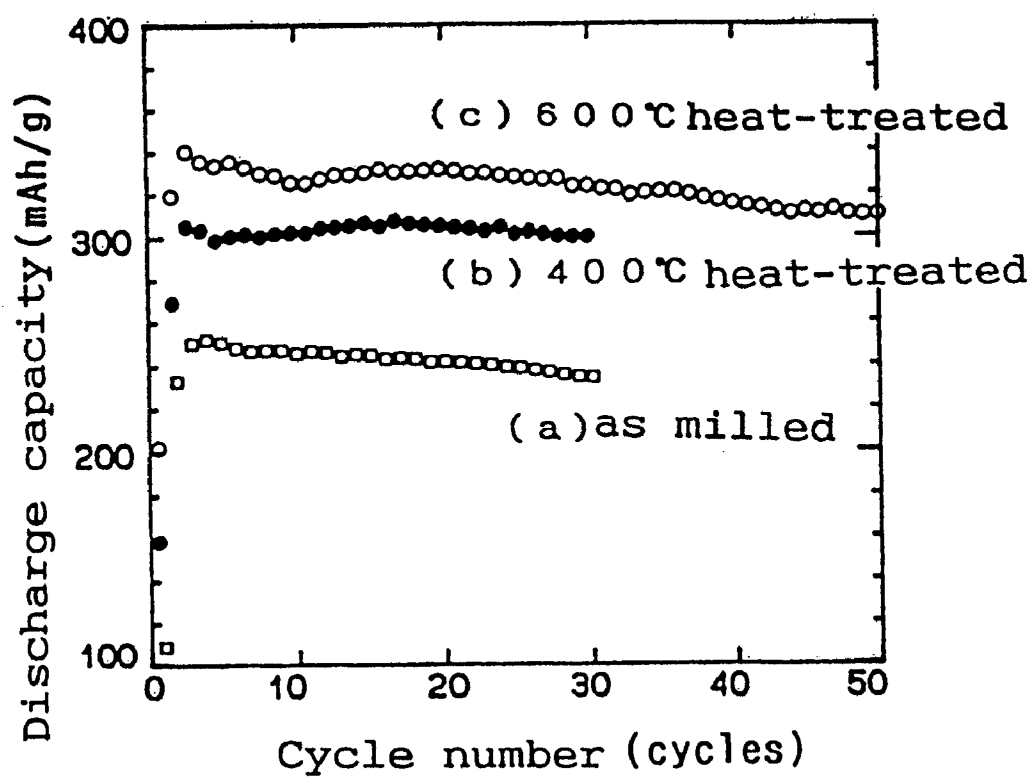
FIG. 2 shows the relationship between the temperature for heat-treating a flaky nickel powder and the discharge capacity of an alloy negative electrode.

(5) Influence of Heat-Treating Temperature of Flaky Nickel Powder On Electrode Capacity Investigation was carried out in the test to see how the heat-treating temperature of the flaky nickel powder affected the electrode capacity. The results are shown in FIG. 2.

An electrode (a) produced using the untreated nickel powder was mechanically bonded to the hydrogen absorbing alloy particles to an unsatisfactory extent, was slow in activation at an initial stage and had a maximum discharge capacity of 250 mAh/g in 3 cycles. An electrode (b) produced using the nickel powder heat-treated to 400° C. quickly raised the discharge capacity (activation at an initial stage) with ease and had a high discharge capacity (alloy utilization efficiency) per alloy weight unit which reached 300 mAh/g. An electrode (c) produced using the nickel powder heat-treated to a higher temperature of 600° C. had a higher discharge capacity of 340 mAh/g, namely markedly increased alloy utilization efficiency.

(6) Structure of Electrode Formed From Flaky Nickel Powder

Figure 3:
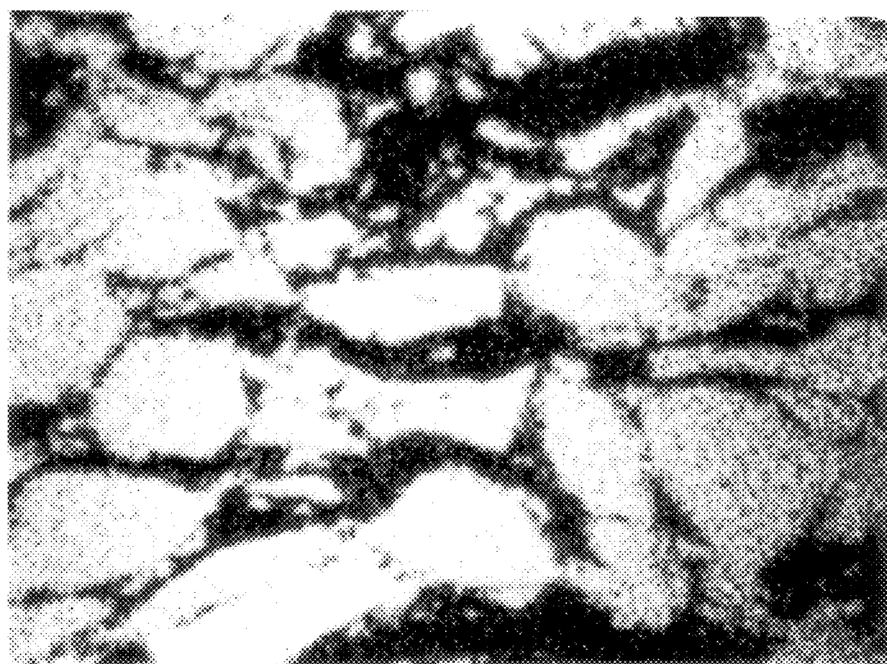
FIG. 3 is an image view showing a cross section structure of the electrode produced in Example 1.

FIG. 3 shows the results of examination using a scanning electron microscope and X-ray microanalyzer in respect of the cross section structure of the electrode produced using the flaky nickel powder heat-treated to 400° C. in above item (1). In FIG. 3, a white portion shows a distribution of the hydrogen absorbing alloy (rare earth element) and a black portion indicates a distribution of the flaky nickel powder.

The results reveal that in the electrode produced using the heat-treated flaky nickel powder, the alloy powder was covered with the flaky nickel powder when compressed in dry press molding, giving a microscopic composite body of the hydrogen-absorbing alloy powder and flaky nickel powder. This reduced the resistance to contact between the hydrogen absorbing alloy powder and the flaky nickel powder and also enlarged the contact area thereof, significantly increasing the alloy utilization efficiency.

(7) Discharging Capability Of Electrode

Figure 4:
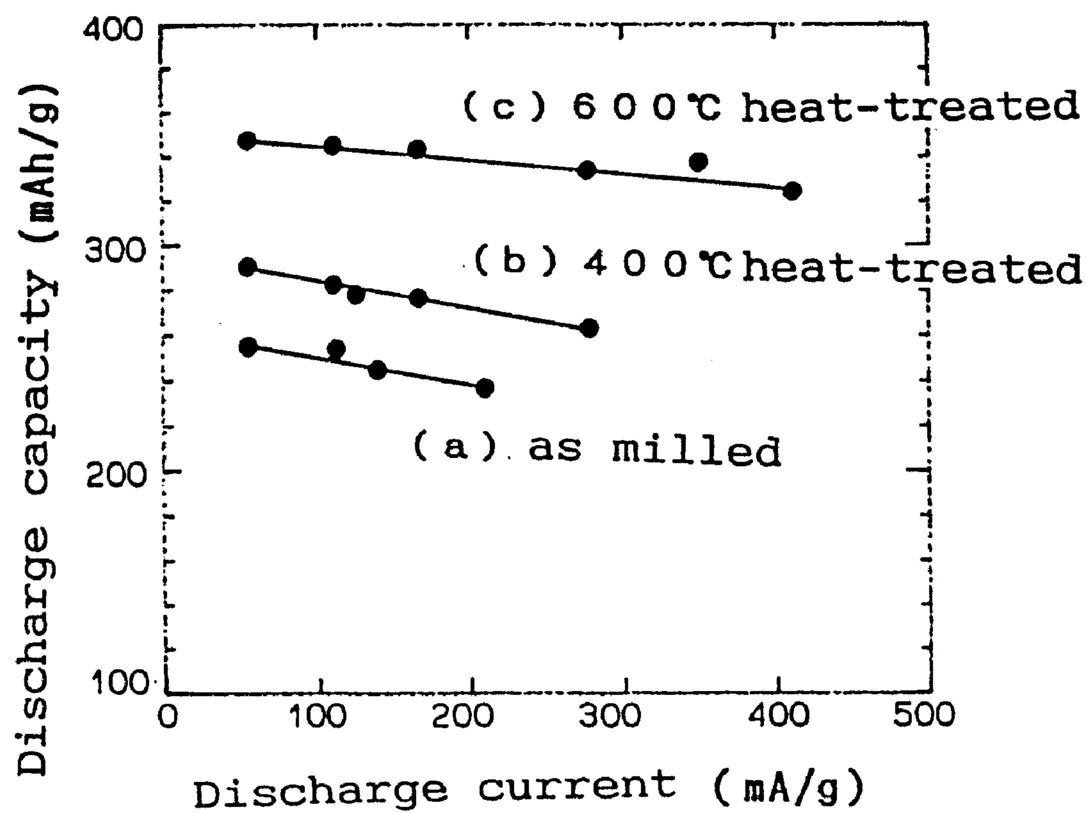
FIG. 4 shows the relationship between the temperature for heat-treating a flaky nickel powder and the discharging capability of an alloy negative electrode.

The discharging capability was investigated at current densities (mA/g) after 50 cycles in a charge and discharge cycle test using an electrode. The electrode was molded by pressure molding at a molding pressure of 294 MPa from a powder mixture of 100 g of a hydrogen absorbing alloy powder and 25 g of said flaky nickel powder heat-treated to respective temperatures. FIG. 4 shows the results of investigation.

In the electrode (c) produced using the nickel powder heat-treated to 6000° C., the discharge capacity at a current density of 420 mA/g retained at least 95% of the discharge capacity at a current density of 50 mA/g, namely the electrode had good discharging capability. This is because the nickel powder was softened by heat treatment, and was given a layer skeleton structure wherein the nickel particles were firmly bonded together by pressure molding to form a good conductive network. When a heat-treated flaky nickel powder is used as described above, the hydrogen absorbing alloy particles are effectively supported by a layer network of the nickel particles, thereby increasing the alloy utilization efficiency.

(8) Influence Of Addition Of Polymer

Figure 5:
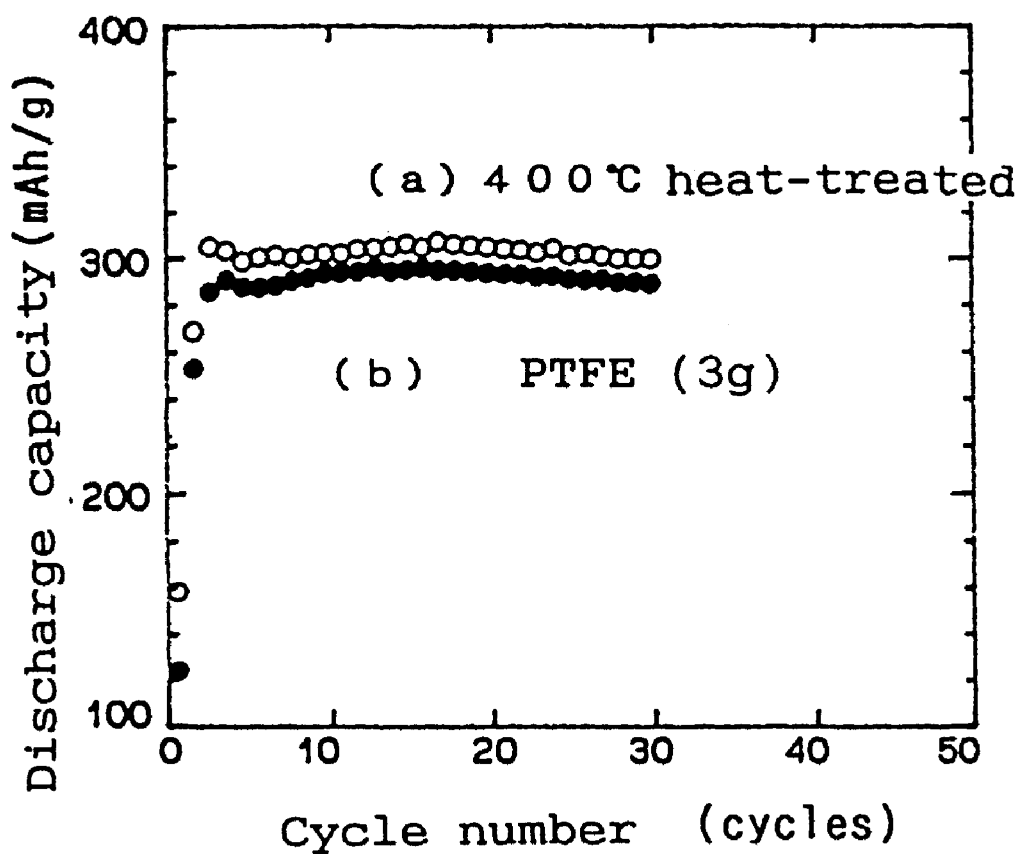
FIG. 5 shows the results of investigating how the properties of an electrode are affected by the presence or the absence of a binder.

Prepared was a powder mixture comprising 100 g of a hydrogen absorbing alloy powder, 25 g of a flaky nickel powder heat-treated to 4000° C. and 3 g of a binder (polytetrafluoroethylene). Investigation was performed to find out how the absence or the presence of a binder affected the properties of electrodes. The results are shown in FIG. 5. Used as a binder was a dispersion of polytetrafluoroethylene (60 wt % calculated as solids).

As apparent from the results shown in FIG. 5, the electrode (b) produced using a binder was slow in activation at an initial stage and had a low discharge capacity as compared with the electrode (a) produced without use of the binder.

Example 2

A nickel hydroxide positive electrode was produced using the flaky nickel powder of lowered strain according to the invention.

A nickel hydroxide powder (100 g) was mixed with 66 g of a nickel powder (Ni/NiOOH=0.66) which was lowered in strain by heat treatment at 400° C. The powder mixture thus obtained was subjected to pressure molding on a nickel mesh at a pressure of 294 MPa, whereby an electrode measuring 30 mm×12 mm× about 0.5 mm (thickness) was molded. An electrode produced using an untreated flaky nickel powder was provided in the same manner.

The electrodes thus obtained were assembled into cells in the same manner as in Example 1, and the properties were evaluated according to the positive electrode regulation. The discharging capability is shown in FIG. 6.

Figure 6:
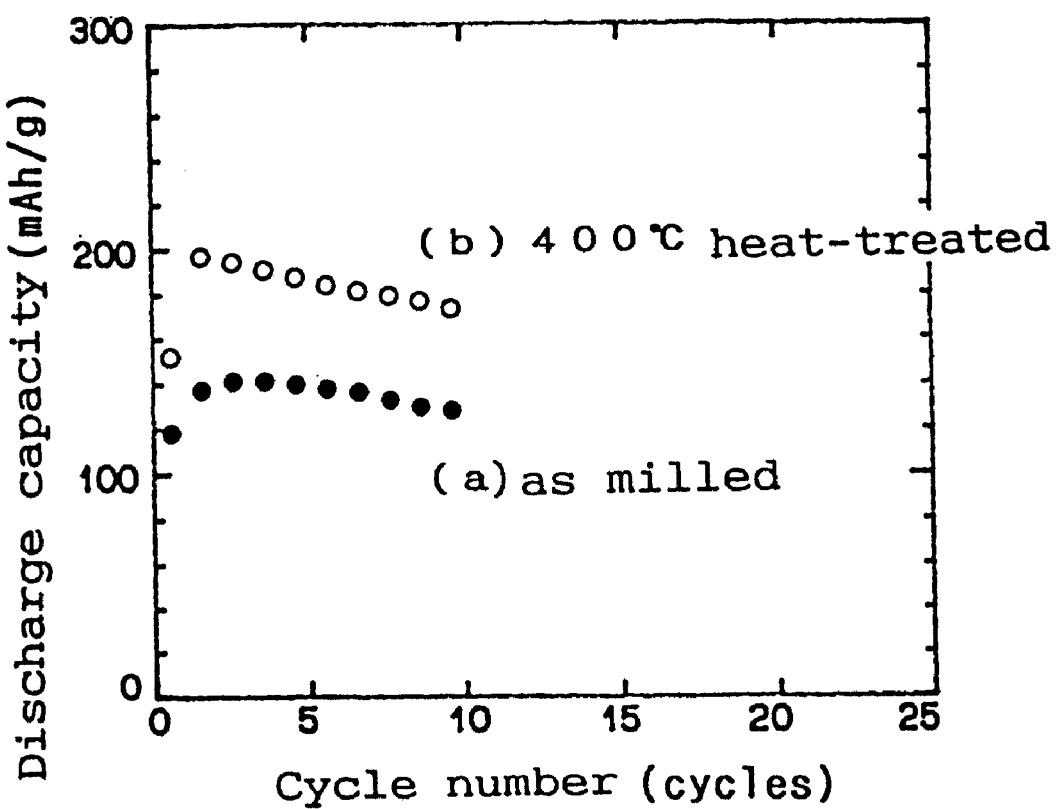
FIG. 6 shows the discharging capability of a nickel hydroxide positive electrode made using a flaky nickel powder.

FIG. 6 shows that the electrode (a) produced using the untreated nickel powder had a discharge capacity of 150 mAh/g, whereas the electrode (b) produced using the nickel powder heat-treated to 400° C. had a discharge capacity of 195 mAh/g, namely 30% higher. In this way, a flaky nickel powder of lowered strain, was given a high electrical conductivity and excellent binding power.

We claim:

1. An electrode for an alkali secondary battery, the electrode comprising a molded product molded from a mixture containing an active material-containing powder and a flaky nickel powder having been heat-treated at a temperature in the range of 300–900° C.

2. The electrode according to claim 1, wherein the flaky nickel powder was 4 to 14 μm in average diameter and 0.5 to 1.0 μm in average thickness, which is ¼ to 1/28 the diameter.

3. The electrode for an alkali secondary battery according to claim 1, wherein the active material is a hydrogen absorbing alloy.

4. The electrode for an alkali secondary battery according to claim 1, wherein a network having the flaky nickel powder arranged in layers is formed.

5. A method for producing an electrode for an alkali secondary battery, the method comprising the steps of heat-treating a flaky nickel powder, mixing the powder with an active material-containing powder, and molding the mixture.

6. The method according to claim 5, wherein the flaky nickel powder is 4 to 14 μm in average diameter and 0.5 to 1.0 μm in average thickness, which is ¼ to 1/28 the diameter.

7. The method according to claim 5, wherein the mixture is molded by a dry press method or a wet press method.

8. The method according to claim 5, wherein the heat-treating temperature is 300 to 9000°.

9. The method according to claim 5, wherein the heat treatment is carried out in an atmosphere of inert gas.

10. A method for producing an electrode for an alkali secondary battery, the method comprising the steps of mixing a flaky nickel powder with an active material-containing powder, molding the mixture and heat-treating the molded product.

11. The method according to claim 10, wherein the mixture is molded by a dry press method or a wet press method.

12. The method according to claim 10, wherein the heat-treating temperature is 300 to 9000°.

13. The method according to claim 10, wherein the heat treatment is carried out in an atmosphere of inert gas. powder having been heat-treated at a temperature in the range of 300–900° C.

14. An electrode for an alkali secondary battery, the electrode comprising a molded product molded from a mixture containing an active material-containing powder and a flaky nickel powder, wherein the flaky nickel powder has a dynamic hardness in the range of,300 DH or less.

15. The electrode for an alkali secondary battery according to claim 14 wherein the flaky nickel powder is 4 to 14 μm in average diameter and 0.5 to 1.0 μm in average thickness, which is ½ to 1/28 the diameter.

16. The electrode for an alkali secondary battery according to claim 14 wherein the active material is a hydrogen absorbing alloy.

17. The electrode for an alkali secondary battery according to claim 14 wherein a network having the flaky nickel powder arranged in layers is formed.

* * * * *